United States Patent
Pon

(10) Patent No.: US 8,571,088 B2
(45) Date of Patent: Oct. 29, 2013

(54) SUPPRESSION OF MULTIPATH EFFECTS FOR RECEIVED SPS SIGNALS

(75) Inventor: Rayman Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 745 days.

(21) Appl. No.: 11/938,743

(22) Filed: Nov. 12, 2007

(65) Prior Publication Data

US 2009/0121928 A1    May 14, 2009

(51) Int. Cl.
*H04B 1/00*    (2006.01)

(52) U.S. Cl.
USPC .. 375/150; 375/148; 342/357.06; 342/357.12

(58) Field of Classification Search
USPC ............... 342/352, 357.01, 357.06, 357.12; 375/130, 148, 150, 346
See application file for complete search history.

(56) References Cited

U.S. PATENT DOCUMENTS

| | | | |
|---|---|---|---|
| 5,901,183 A | 5/1999 | Garin et al. | |
| 5,903,597 A | 5/1999 | Pon | |
| 5,999,561 A * | 12/1999 | Naden et al. | 375/142 |
| 6,243,409 B1 | 6/2001 | Fenton et al. | |
| 6,775,252 B1 * | 8/2004 | Bayley | 370/328 |
| 7,113,538 B1 * | 9/2006 | Chen et al. | 375/150 |
| 7,130,332 B1 * | 10/2006 | Shenoi | 375/150 |
| 7,764,226 B1 * | 7/2010 | Veitsel et al. | 342/357.73 |
| 2003/0207681 A1 * | 11/2003 | Rowitch | 455/404.2 |
| 2004/0146126 A1 * | 7/2004 | Wheatley et al. | 375/343 |
| 2005/0270997 A1 * | 12/2005 | Julien et al. | 370/315 |
| 2006/0034393 A1 * | 2/2006 | Camp, Jr. | 375/324 |
| 2007/0258511 A1 | 11/2007 | Knight et al. | |
| 2008/0089393 A1 * | 4/2008 | Opperman | 375/141 |
| 2008/0159198 A1 * | 7/2008 | Chen et al. | 370/315 |
| 2009/0279592 A1 * | 11/2009 | Pratt et al. | 375/148 |

FOREIGN PATENT DOCUMENTS

| | | |
|---|---|---|
| EP | 0892277 A2 | 1/1999 |
| JP | 2006502665 A | 1/2006 |
| JP | 2006523970 A | 10/2006 |
| TW | 269561 B | 12/2006 |
| TW | 273267 B | 2/2007 |
| WO | 2004034604 A1 | 4/2004 |
| WO | 2004093339 A1 | 10/2004 |

OTHER PUBLICATIONS

Galileo BOC(1,1) Prototype Receiver Development: Neil Gerein, NovAtel Inc., Michael Olynik, NovAtel Inc., and Michael Clayton, NovAtel Inc.; Proc of ION GNSS, Sep. 21-24, 2004, Long Beach, CA.

European Search Report—EP08005494, Search Authority—Munich Patent Office, Aug. 7, 2008.

(Continued)

*Primary Examiner* — Leon-Viet Nguyen

(57) ABSTRACT

The subject matter disclosed herein relates to suppressing the effects of multipath signals. For an example, a signal comprising at least one binary offset carrier (BOC) modulation signal is received. The BOC modulation signal is modulated with a pseudorandom noise sequence comprising a plurality of chips, wherein each of the chips has a set interval. The received signal is correlated with portions of the plurality of chips to provide a power signal and to remove at least a portion of a multipath component in the received signal from the power signal. The portions of the chips are less than the set interval.

37 Claims, 14 Drawing Sheets

(56) References Cited

OTHER PUBLICATIONS

Fernando D Nunes at al., "Gating Functions for Multipath Mitigation in GNSS BOC Signals" IEEE Transactions on Aerospace and Electronic Systems, IEEE Service Center, Piscataway, NJ, US, vol. 43, No. 3, Jul. 1, 2007, pp. 951-964, XP011197333, ISSN: 0018-9251, Section 11, VI; pp. 952-961; figure 3.

International Search Report and Written Opinion—PCT/US2008/083278, International Searching Authority, European Patent Office, Jan. 19, 2009.

Sousa F M et al., "Strobe Pulse Design for Multipath Mitigation in BOC GNSS Receivers" Apr. 25, 2006-Apr. 27, 2006, pp. 348-355, XP01924950.

Sanghun Kim et al., "A Novel Unambiguous Multipath Mitigation Scheme for BOC(kn, n) Tracking in GNSS," Applications and the Internet Workshops, 2007. Saint Workshops 2007. International Symposium on , vol, no, pp. 57, Jan. 2007.

Taiwan Search Report—TW097143697—TIPO—Jul. 28, 2012.

Heiries, V., et al., "An enhanced correlation processing multipath mitigation technique for BOC signals", Proceedings of IEEE/ION PLANS 2006, Apr. 25-27, 2006, pp. 342-347.

\* cited by examiner

--PRIOR ART --

--PRIOR ART--

--PRIOR ART--

--PRIOR ART--

SUPPRESSION OF MULTIPATH EFFECTS FOR RECEIVED SPS SIGNALS

BACKGROUND

1. Field

The subject matter disclosed herein relates to the suppression of multipath effects for signals received from satellite positioning systems.

2. Information

A satellite positioning system (SPS) typically comprises a system of earth orbiting satellites enabling entities to determine their location on the earth based, at least in part, on signals received from the satellites. Such an SPS satellite typically transmits a signal marked with a repeating pseudorandom noise (PRN) code of a set number of chips. For example, a satellite in a constellation of a Global Navigation Satellite System (GNSS) such as GPS or Galileo may transmit a signal marked with a PRN code that is distinguishable from PRN codes transmitted by other satellites in the constellation.

To estimate a location at a receiver, a navigation system may determine pseudorange measurements to satellites "in view" of the receiver using well known techniques based, at least in part, on detections of PRN codes in signals received from the satellites. Such a pseudorange to a satellite may be determined based, at least in part, on a code phase detected in a received signal marked with a PRN code associated with the satellite during a process of acquiring the received signal at a receiver. To acquire the received signal, a navigation system typically correlates the received signal with a locally generated PRN code associated with a satellite. For example, such a navigation system typically correlates such a received signal with multiple code and/or time shifted versions of such a locally generated PRN code. Detection of a particular time and/or code shifted version yielding a correlation result with the highest signal power may indicate a code phase associated with the acquired signal for use in measuring pseudorange as discussed above.

FIG. 1 illustrates an application of an SPS system, whereby a subscriber station 100 in a wireless communications system receives transmissions from satellites 102a, 102b, 102c, 102d in the line of sight to subscriber station 100, and derives time measurements from four or more of the transmissions. Subscriber station 100 may provide such measurements to position determination entity (PDE) 104, which determines the position of the station from the measurements. Alternatively, the subscriber station 100 may determine its own position from this information.

Subscriber station 100 may search for a transmission from a particular satellite by correlating the PRN code for the satellite with a received signal. The received signal typically comprises a composite of transmissions from one or more satellites within a line of sight to a receiver at station 100 in the presence of noise. A correlation is typically performed over an integration time "I" which may be expressed as the product of $N_c$ and M, where $N_c$ is the coherent integration time, and M is the number of coherent integrations which are non-coherently combined. For a particular PRN code, correlation values are typically associated with corresponding PRN code shifts and Doppler bins to define a two-dimensional correlation function.

FIG. 2 depicts an example idealized correlation function for a SPS signal received along a direct line of sight in the absence of interference from multipath signals. For this example, the SPS signal is a GPS signal. FIG. 3 provides a close-up view of the example correlation function. Peaks of the correlation function are located and compared to a predetermined noise threshold. The threshold is typically selected so that the false alarm probability, the probability of falsely detecting a code phase of a received SPS signal, is at or below a predetermined value. The triangular shape of the correlation function of FIG. 3 indicates that there is little or no correlation between the received GPS signal and the local replica of the code when the code phase offset is greater than about 1 chip in either direction. The bulk of the power in the correlation function of FIG. 3 occurs within the region between +1 and −1 chips offset from the received direct path GPS code signal.

FIG. 4 is a diagram depicting an autocorrelation function for a direct signal 401 combined with a multipath signal 403 with a positive polarity. The resulting composite signal 405 depicts the effects caused by the reflected multipath signal 403 interfering with the direct path signal 401 as the two signals 401 and 403 are received at an antenna and processed at a receiving device. Although FIG. 4 depicts only a single multipath signal, it is common for multiple multipath signals to contribute to distortions of the direct path signal. In general, multipath signals may comprise a signal from a transmitter that reflect from mountains, buildings, etc., before reaching a receiver. Multipath signals are delayed relative to the direct signal due to the increased distance they travel from the transmitter to the receiver relative to the direct path signal. As a result of the reflections, multipath signals are typically lower in amplitude compared to the direct path signal. For this example, multipath signal 403 adds to direct signal 401 to yield composite signal 405.

Although multipath signal 403 for this example is depicted as having a positive polarity with respect to direct signal 401, it is possible for multipath signals to arrive at the receiver with a polarity opposite that of the direct signal. For the situation where the multipath signal has a polarity opposite that of the direct signal, the resulting composite signal will have a reduced amplitude relative to the direct signal due to the cancellation caused by the negative-polarity multipath signal.

As described above, superposition at the receiver of any additional signal onto the desired direct signal from the satellite during the period of time when signal correlation occurs may distort the autocorrelation function and produce an altered correlation function for the composite signal, such as that depicted by composite signal 405 in FIG. 4. These distortions may lead to errors during correlation tracking functions, which may result in errors in pseudorange measurements, and which may further produce errors in estimated location coordinates for the receiver.

SUMMARY

In one aspect, a signal comprising at least one binary offset carrier (BOC) modulation signal is received. The BOC modulation signal is modulated with a pseudorandom noise sequence comprising a plurality of chips, wherein each of the chips has a set interval.

In another aspect, the received signal is correlated with portions of the plurality of chips to provide a power signal and to remove at least a portion of a multipath component in the received signal from the power signal. The portions of the chips are less than the set interval.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
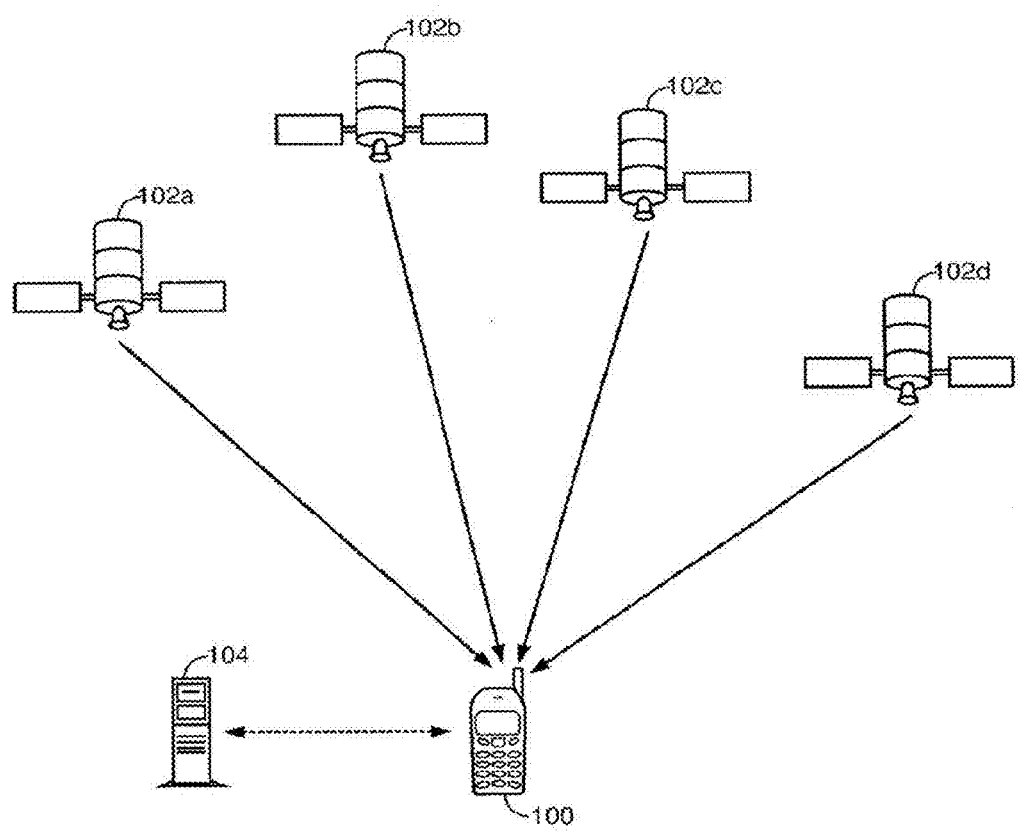
FIG. 1 is a block diagram of an example of a satellite positioning system (SPS).

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

Location determination techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

In one example, a device and/or system may estimate its location based, at least in part, on signals received from satellites. In particular, such a device and/or system may obtain "pseudorange" measurements comprising approximations of distances between associated satellites and a navigation satellite receiver. In a particular example, such a pseudorange may be determined at a receiver that is capable of processing signals from one or more satellites as part of a Satellite Positioning System (SPS). Such an SPS may comprise, for example, a Global Positioning System (GPS), Galileo, Glonass, to name a few, or any SPS developed in the future. To determine its position, a satellite navigation receiver may obtain pseudorange measurements to three or more satellites as well as their positions at time of transmitting. Knowing the satellite's orbital parameters, these positions can be calculated for any point in time. A pseudorange measurement may then be determined based, at least in part, on the time a signal travels from a satellite to the receiver, multiplied by the speed of light. While techniques described herein may be provided as implementations of location determination in a GPS and/or Galileo types of SPS as specific illustrations, it should be understood that these techniques may also apply to other types of SPS, and that claimed subject matter is not limited in this respect.

Techniques described herein may be used with any one of several SPS, including the aforementioned SPS, for example. Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites are useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

A "Global Navigation Satellite System" (GNSS) as referred to herein relates to an SPS comprising satellites transmitting synchronized navigation signals according to a common signaling format. Such a GNSS may comprise, for example, a constellation of satellites in synchronized orbits to transmit navigation signals to locations on a vast portion of the Earth's surface simultaneously from multiple satellites in the constellation. A satellite which is a member of a particular GNSS constellation typically transmits navigation signals in a format that is unique to the particular GNSS format. Accordingly, techniques for acquiring a navigation signal transmitted by a satellite in a first GNSS may be altered for acquiring a navigation signal transmitted by a satellite in a second GNSS. In a particular example, although claimed subject matter is not limited in this respect, it should be understood that GPS, Galileo and Glonass each represent a GNSS which is distinct from the other two named SPS. However, these are merely examples of SPS associated with distinct GNSS and claimed subject matter is not limited in this respect.

For an example, a navigation receiver may obtain a pseudorange measurement to a particular satellite based, at least in part, on an acquisition of a signal from the particular satellite which is encoded with a periodically repeating PRN code sequence. Acquisition of such a signal may comprise detecting a "code phase" which is referenced to time and associated with a point in the PRN code sequence. In one particular example, such a code phase may be referenced to a state of a locally generated clock signal and a particular chip in the PRN code sequence. However, this is merely an example of how a code phase may be represented and claimed subject matter is not limited in this respect.

To detect code phase in a received SPS signal, a navigation system may correlate the received signal with multiple code and/or time shifted versions of locally generated PRN code sequence associated with "code phase hypotheses" spanning an entire period of a periodically repeating PRN code sequence. In a particular example of a Galileo signal, a PRN code sequence may comprise 4,092 chips and repeats every 4 milliseconds. The PRN code sequence may be modulated with a 1.023 MHz square wave to produce a BOC (1,1) signal (discussed below). Accordingly, to detect a code phase of a signal received from a Galileo transmitter, a navigation system may correlate the received signal with 4,092 or more versions of a locally generated BOC sequence derived from a PRN code sequence associated with the Galileo transmitter, phase shifted at increments of a single chip or smaller.

Figure 4:
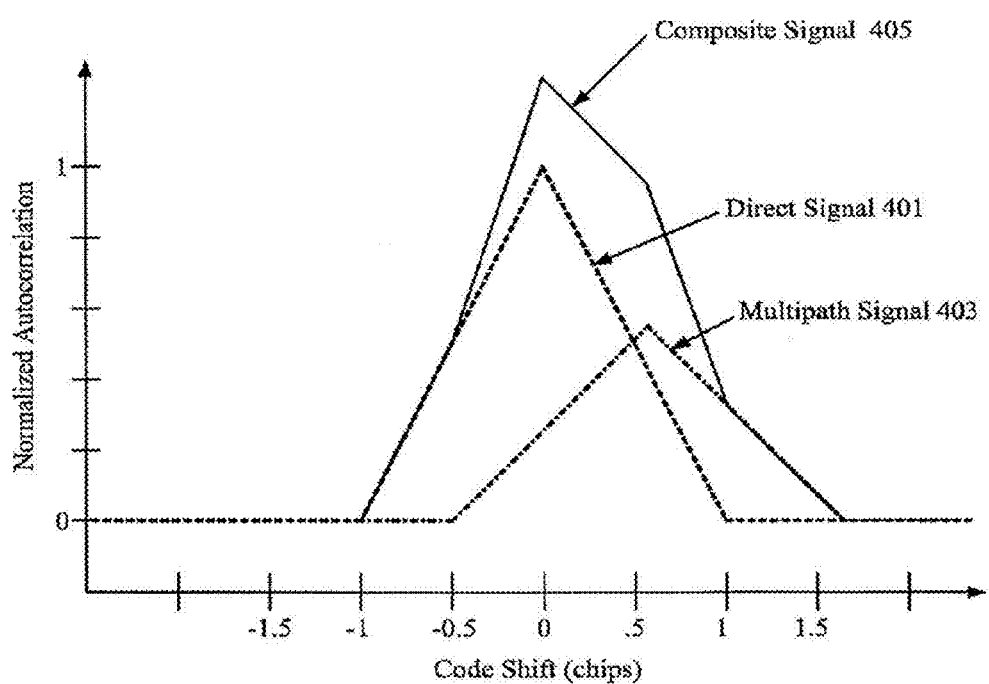
FIG. 4 is a diagram depicting an autocorrelation function for a direct SPS signal combined with a multipath signal with a positive polarity.

As discussed above, it is common for multiple multipath signals to contribute to distortions of a direct path signal received from an SPS satellite at a receiver. Returning again to FIG. 4, an example is shown where multipath signal 403 adds to direct signal 401 to yield composite signal 405. The difference between composite signal 405 and direct signal 401 may be referred to as multipath error.

As also described above, the distortions caused by multipath signals may lead to errors during correlation tracking functions, which may result in errors in pseudorange measurements, which may in turn further produce errors in estimated location coordinates for the receiver.

Figure 5:
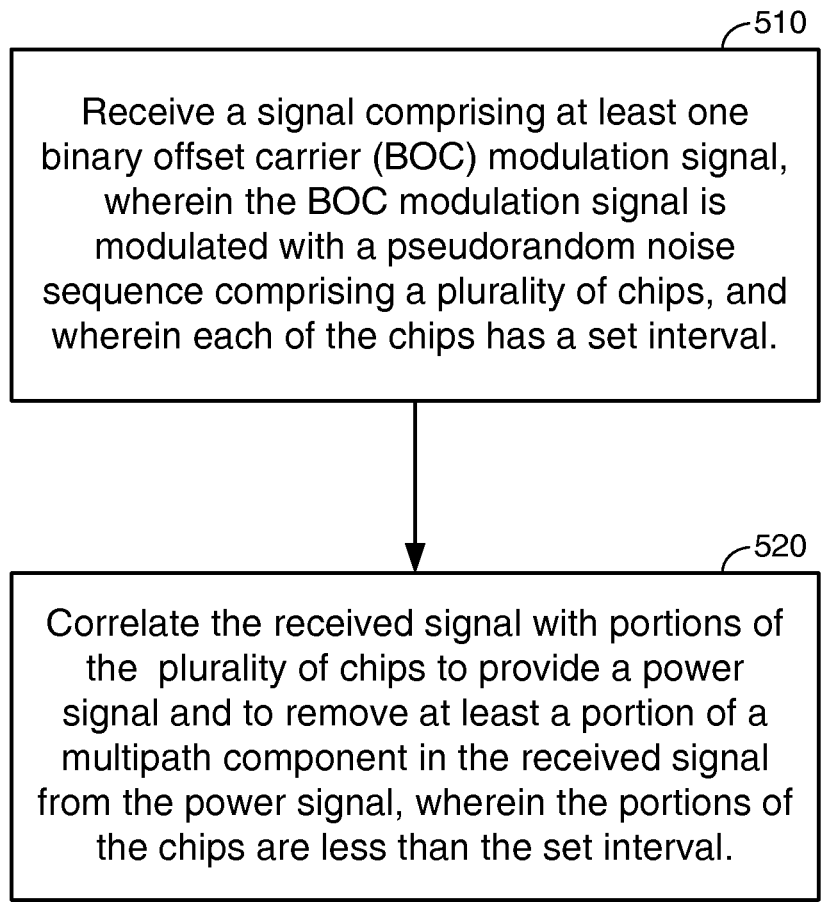
FIG. 5 is a flow diagram of an example of a method for autocorrelation of a BOC signal to suppress multipath effects.

FIG. 5 is a flow diagram of an example of a method for suppressing the effects of multipath signals. At block 510, a signal comprising at least one binary offset carrier (BOC) modulation signal is received. The BOC modulation signal is modulated with a pseudorandom noise sequence comprising a plurality of chips, wherein each of the chips has a set interval. At block 520, the received signal is correlated with portions of the plurality of chips to provide a power signal and to remove at least a portion of a multipath component in the received signal from the power signal. The portions of the chips are less than the set interval. Examples in accordance with claimed subject matter may include all, more than all, or less than all of blocks 1410-1420. In one implementation, all or a portion of the example method depicted in FIG. 5 may be performed by a subscriber station such as that described below in connection with FIG. 14.

For one example, the portion of the plurality of chips used in correlation may include a middle region. The middle region may comprise approximately one-half of a chip period centered approximately at a mid-point of the chip period for each of the plurality of chips of the binary offset modulation signal. For another example, the middle region may comprise approximately one-eighth of a chip period centered approximately at the mid-point of the chip period for each of the plurality of chips of the binary offset modulation signal. However, these are merely examples of possible specified regions, and the scope of the claimed subject matter is not limited in this respect.

For an example, the binary offset carrier modulation signal may comprise a BOC(1,1) signal derived at least in part from a pseudo-random noise signal. The BOC(1,1) signal may be received from a satellite for an example. Also for an example, the satellite may comprise a Galileo satellite, although the scope of the claimed subject matter is not limited in this respect. Further, for an example the BOC signal may be received at a subscriber station, such as, for example, subscriber station 100 described above.

Further, for an example, the one or more specified regions may comprise a region centered at a chip boundary. Such a region may provide for autocorrelation processing of areas where signal transitions occur at bit boundaries. Processing these bit boundary regions may provide an increase in power over implementations where only middle portions are processed. For another example, the regions centered at chip boundaries may include regions centered at chip boundaries where a bit transition is present, that is, where a bit transition is present approximately at the chip boundary. For this example, regions centered at chip boundaries where no bit transition is present may not be processed.

Also, for an example, the specified regions may be defined by programmable parameters. For one example, such parameters may be stored in a memory device at a subscriber station, for example memory 1430 described below, although the scope of the claimed subject matter is not limited in this respect. Programmable parameters for some examples may include, but are not limited to, a parameter specifying a center location and/or a parameter specifying a region size.

For an example, a receiver may receive an SPS signal encoded with a periodically repeating PRN code from a satellite. For one or more examples, the PRN code may be encoded according to a binary offset carrier (BOC) modulation signal. To acquire the first signal, such a receiver may detect a Doppler frequency in the received signal while correlating code and/or time-shifted versions of a locally generated code sequence with the received first signal. In a particular example where the first satellite transmits an SPS signal encoded with a periodically repeating PRN code 4,092 chips long, the received signal may be correlated over as many as 4,092 or more versions of an associated locally generated code sequence, code and/or time-shifted in single chip or smaller increments. However, this is merely an example of how a signal from a satellite of a particular SPS may be acquired, and claimed subject matter is not limited in this respect. Such a correlation operation for a BOC(1,1) modulated PRN signal may be expressed according to relation (1) as follows:

$$CP = h \text{ for Max}\left[\sum_{j=0}^{m-1} \int_{t=t1}^{t=t2} \text{Chip}_{j-h} * RS_j dt\right], \quad (1)$$

where $h \in \{0, 1, \ldots, m-1\}$ where:
m=number of chips in a periodically repeating PRN code sequence of a signal received from a satellite;
CP=code phase detected in signal received from the satellite at a reference time;
Chip$_i$=i$^{th}$ chip in locally generated PRN code sequence for the satellite, $0 \le i < m$;
RS$_i$=i$^{th}$ segment in signal received from the satellite, $0 \le i < m$; and
t1, t2=period of a chip over which the integration is performed.

As may be observed from relation (1) above, h is within a search range of 0 to m−1, entailing performing an m number of correlation operations on a signal received from the satellite to exhaustively search code phase hypotheses in an entire PRN code interval for detecting a maximum correlation result.

The term "power signal" as used herein may denote an output of a correlation function. For an example, referring to relation 1 above, a power signal may comprise the summation of the m integrations performed over the period from t1 to t2 for the chips in the code sequence.

Figure 6:
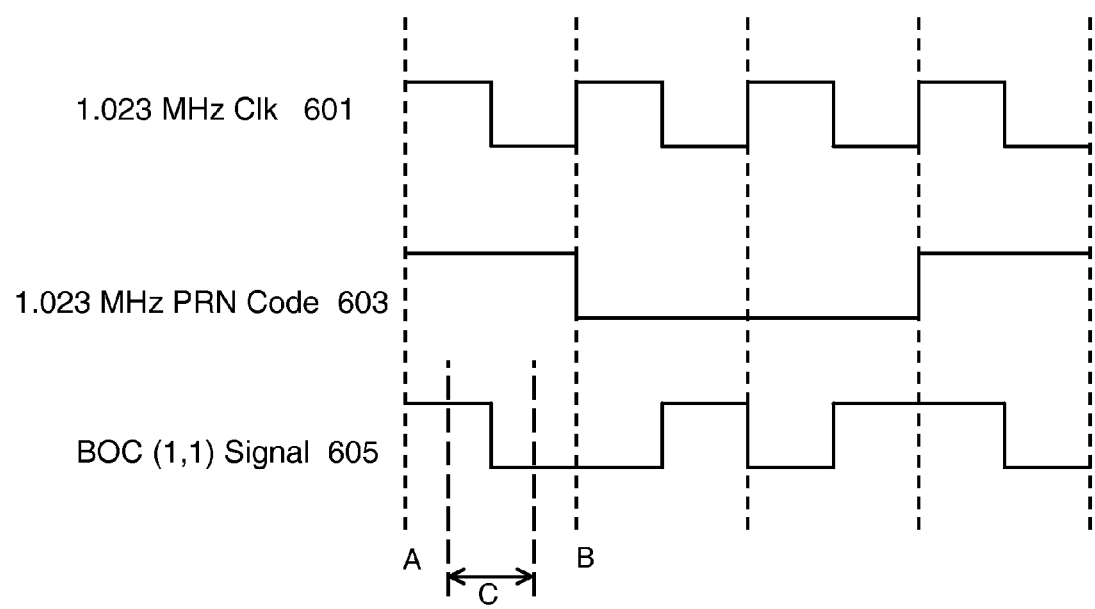
FIG. 6 is an example timing diagram depicting the formation of a binary offset carrier signal derived from a PRN code sequence.

FIG. 6 is an example timing diagram depicting the formation of a binary offset carrier (BOC) signal derived from a PRN code sequence. While the GPS course/acquisition (C/A) code comprises a binary phase shift keying signal with a chipping rate of 1.023 MHz, a Galileo GNSS may utilize a BOC signal. In addition, future GPS satellites may also utilize a BOC signal, such as the L1C signal. For BOC signals, the PRN code is mixed with a square wave at a given subcarrier frequency. The notation BOC(1,1) indicates that the signal has a square wave subcarrier frequency of 1.023 MHz and a chipping rate of 1.023 MHz. The generation of an example BOC(1,1) signal is depicted in FIG. 6. The top line in FIG. 6 is a 1.023 MHz square wave 601, the middle line comprises a portion of an example 1.023 MHz spreading code (PRN code) 603, and the bottom line is a resulting BOC(1,1) signal 605. Although BOC signals are disclosed herein as being used in the Galileo GNSS, other examples may comprise BOC signals used with other satellite positioning systems, and the scope of the claimed subject matter is not limited in this respect. Further, although examples are described herein using BOC(1,1) signals, other BOC variations may be used in other examples. For instance, an example may utilize a BOC (5,1) signal, although the scope of the claimed subject matter is not limited in this respect.

Figure 2:
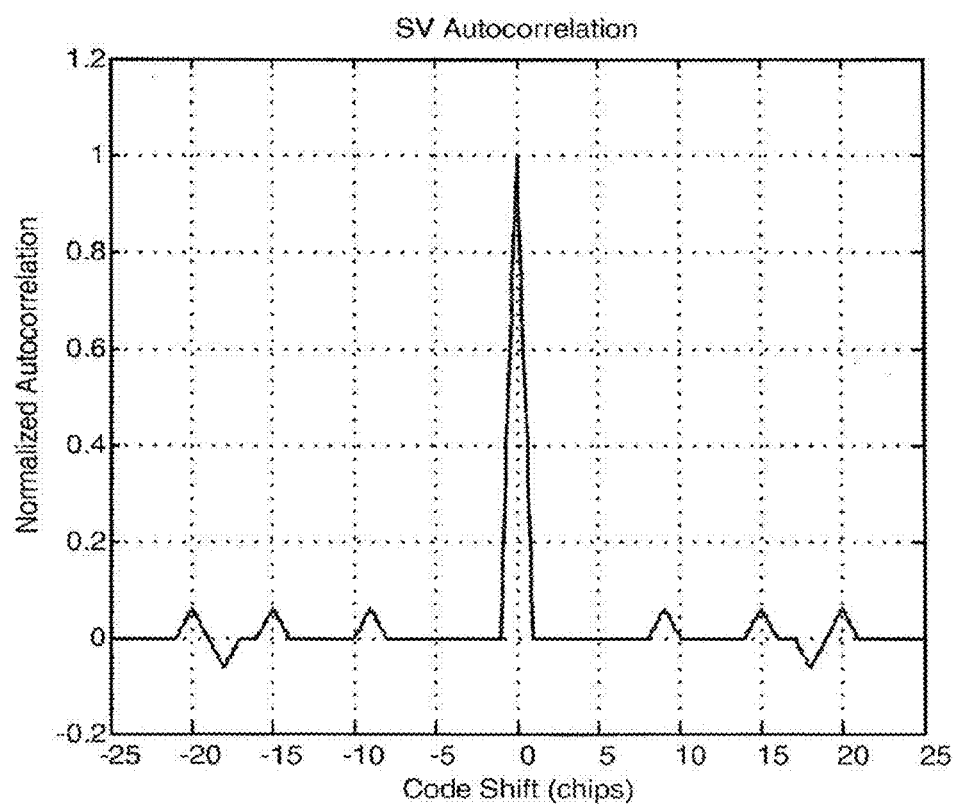
FIG. 2 is a diagram depicting an autocorrelation function for an SPS signal.
Figure 3:
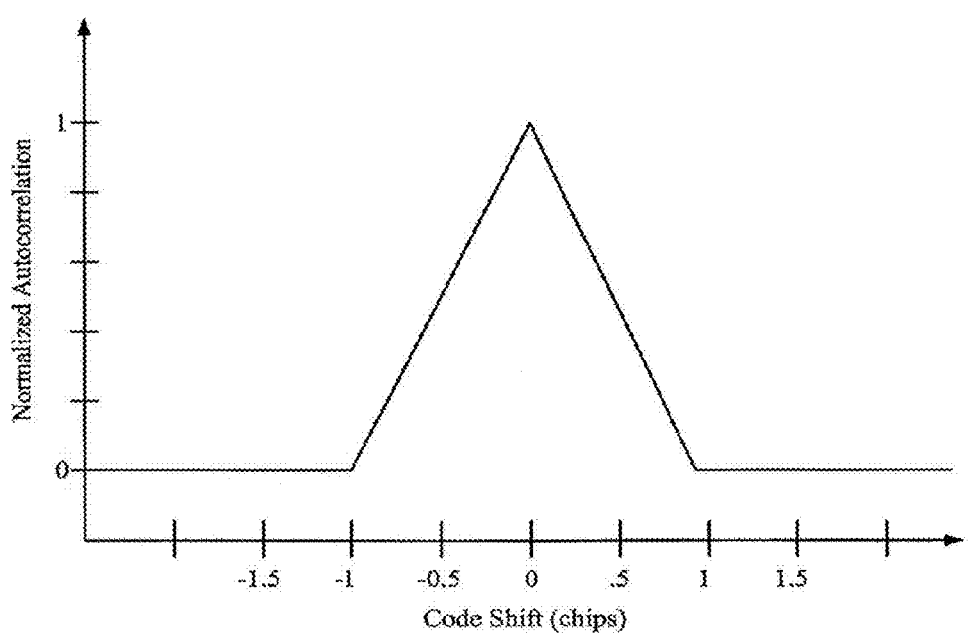
FIG. 3 is a diagram depicting a close-up view of an autocorrelation function for an SPS signal.
Figure 7:
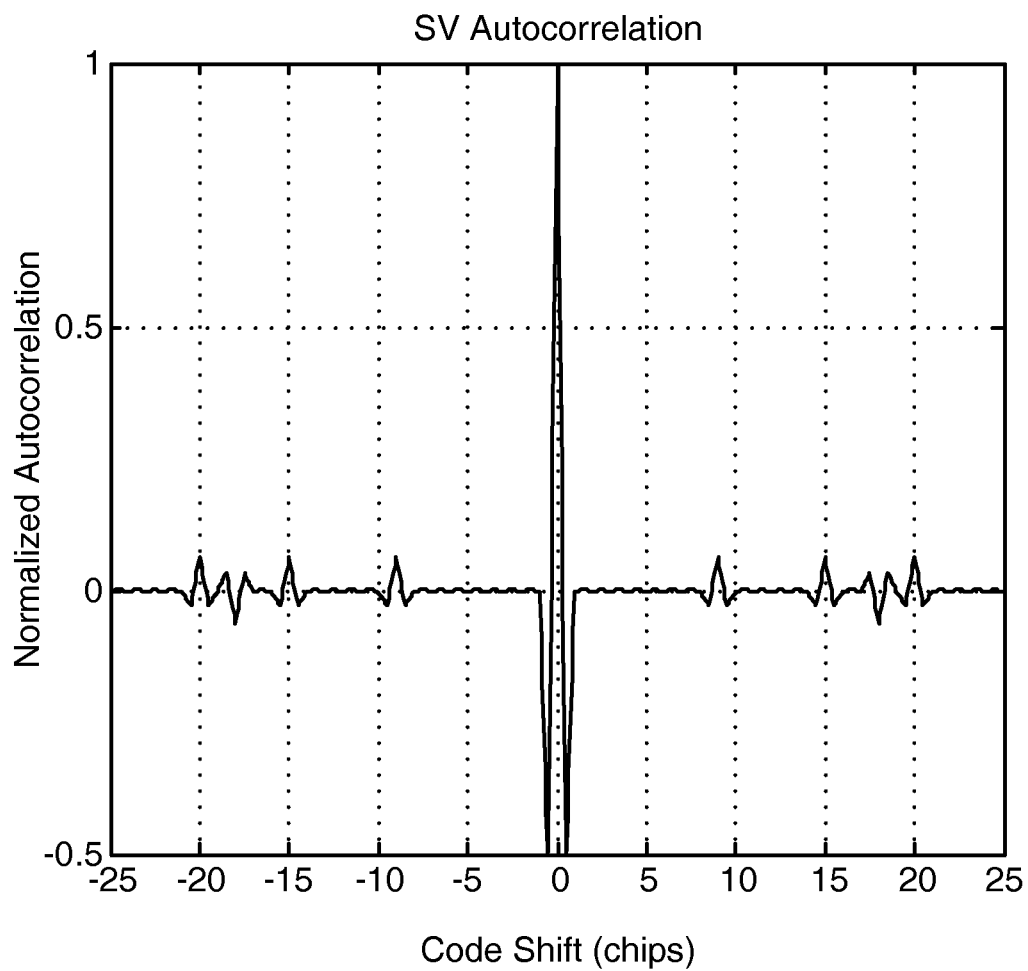
FIG. 7 is a diagram depicting an autocorrelation function for a binary offset carrier (BOC) signal derived from a PRN code sequence.
Figure 8:
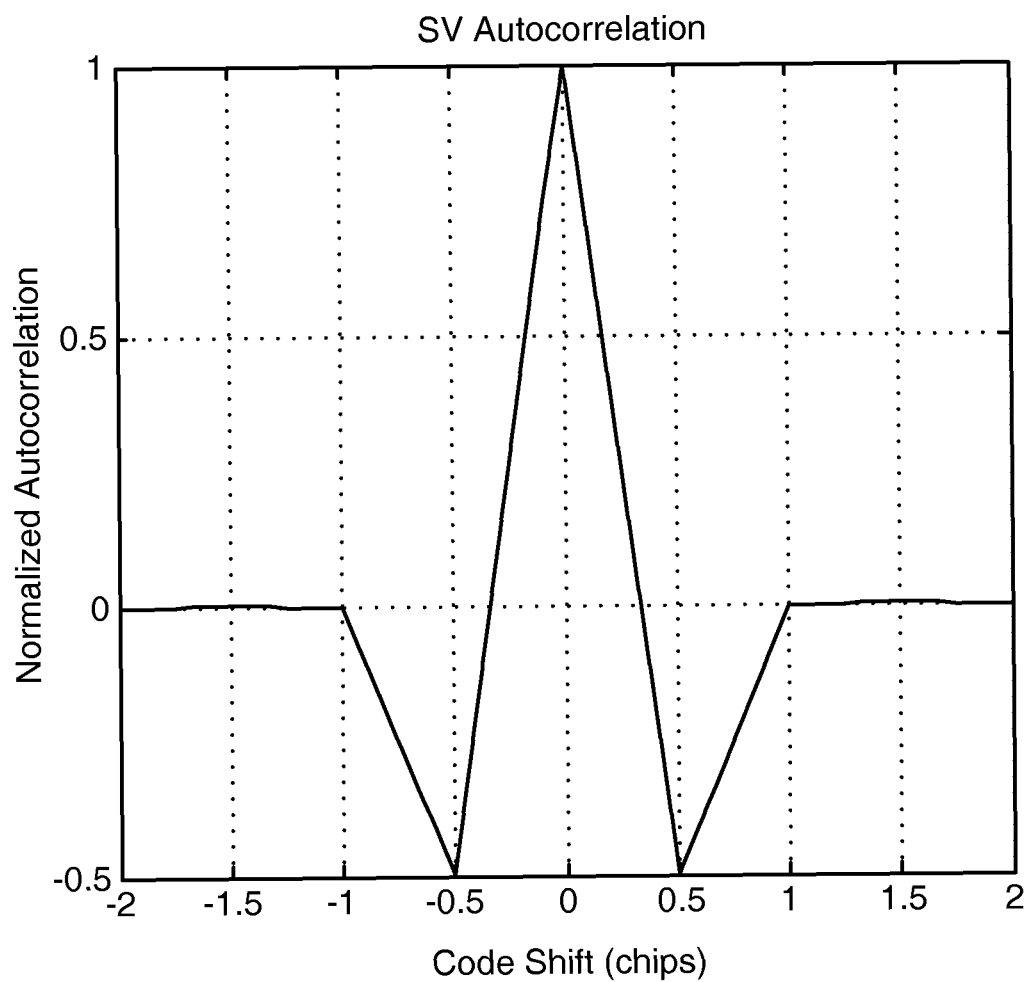
FIG. 8 is a diagram depicting a close-up view of an autocorrelation function for a BOC signal.

FIG. 7 is a diagram depicting an autocorrelation function for a BOC(1,1) signal derived from a PRN code sequence, and FIG. 8 is a close-up view of the autocorrelation function. Compared with the GPS signal autocorrelation function depicted in FIGS. 2-3, the square wave subcarrier modulation used with BOC(1,1) causes the autocorrelation function depicted in FIGS. 7-8 to have a sharper main peak and two smaller negative side peaks. Compared to the GPS autocorrelation function depicted for example in FIGS. 2-3, the main peak of the BOC autocorrelation function has a slope three times steeper. For example, the main peak of the GPS autocorrelation function has a slope of 1 while the main peak of the BOC autocorrelation function has a slope of 3. As can be seen in FIGS. 7-8, the first nulls of the BOC(1,1) autocorrelation function lie at +/−⅓ of a chip from the 0$^{th}$ chip (location of main peak lobe).

For the example waveforms depicted in various figures discussed herein, an infinite bandwidth is assumed merely for illustrative purposes. In the case of a limited bandwidth system, for example, the sharp peaks would be more rounded.

For typical SPS autocorrelation computation, a 2 samples per chip sample spacing may be sufficient for adequate code tracking. For BOC signals, however, a 2 samples per chip sample spacing with conventional autocorrelation techniques may result in reduction or loss of signal due to the shape of the autocorrelation function waveform between the main peak lobe and the side lobes. Interpolation may also prove problematic due to the shape of the waveform between the main peak lobe and the side lobes.

For an example of an autocorrelation function of a BOC(1, 1) signal in accordance with claimed subject matter, the correlation function may be performed by processing only a middle portion of each chip period. For example, referring to FIG. 6, boundaries for one chip may be delineated by chip boundaries A and B. The portion of the chip delineated by boundaries A and B that may be processed during autocorrelation processing for one example may comprise the middle portion C of the chip period, which for this example comprises approximately the middle half of the chip period, with ¼ chip regions located before and after the middle section. The regions outside of the middle region are not processed in this example during autocorrelation processing. Referring to relation 1, above, the chip defined by boundaries A and B may represent the chip period T, and the middle portion C may be represented by the portion ranging from t1-t2, where t1=T/4 and t2=3T/4.

Note that for this example the middle section is centered around the BOC signal transition. Of course, for these examples the chip period delineated by boundaries A and B is merely one of many chip periods in BOC(1,1) signals that may be correlated in this manner. Further, although this example describes processing the middle half of a chip period, other examples are possible with other middle region sizes as well as other region locations. Examples described herein may provide suppression of multipath error due to the characteristics of the autocorrelation functions depicted, by way of non-limiting examples, in FIGS. 9-12.

Figure 9:
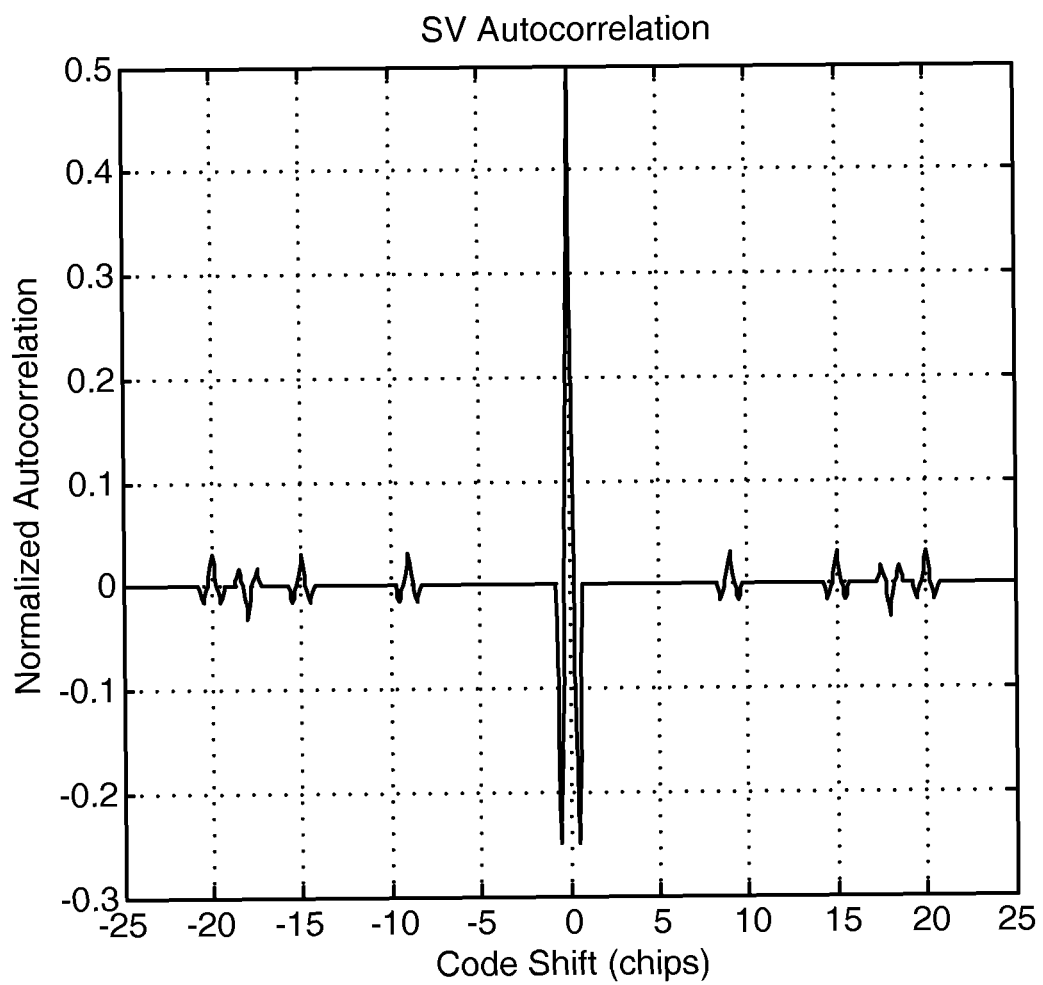
FIG. 9 is a diagram depicting an autocorrelation function for a middle portion of chips in a code sequence of a BOC signal.
Figure 10:
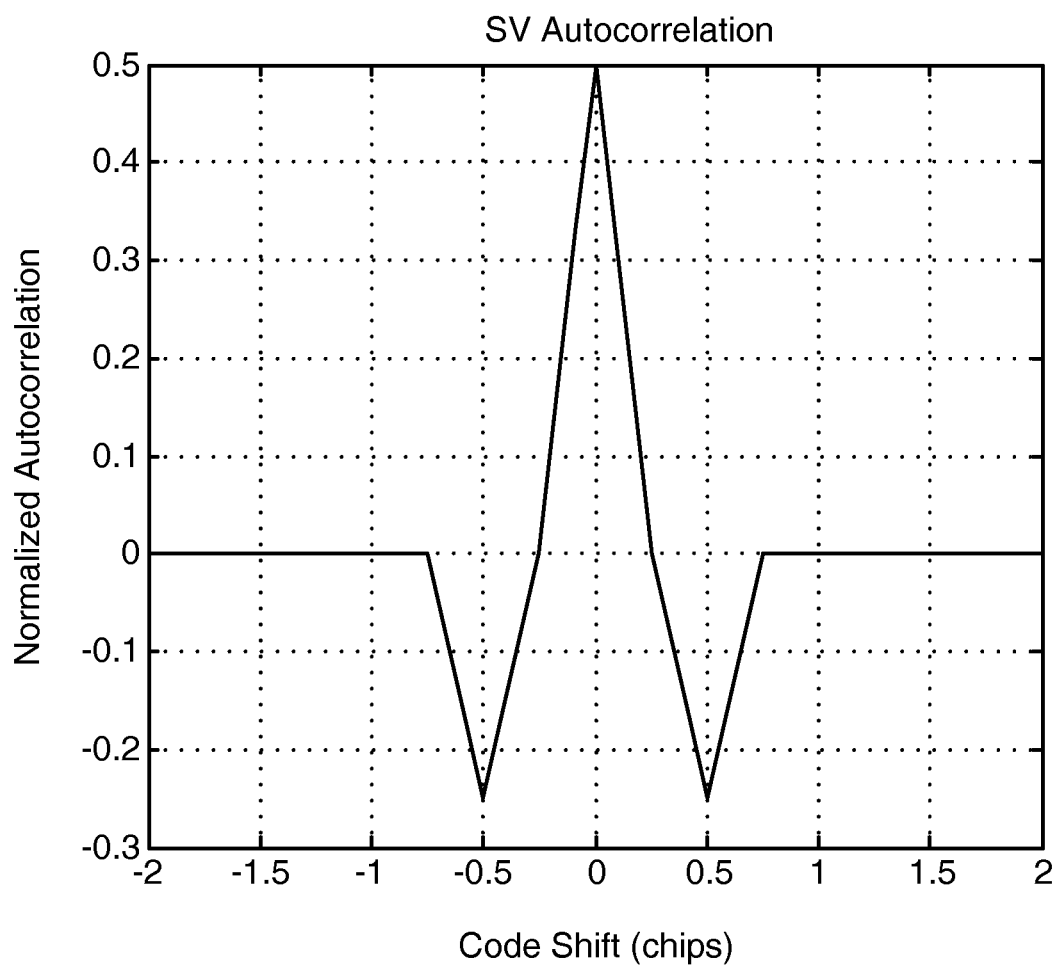
FIG. 10 is a diagram depicting a close-up view of an autocorrelation function for a middle portion of chips in a code sequence of a BOC signal.

FIG. 9 is a diagram depicting an autocorrelation function for a middle portion of each of a plurality of chips of a BOC signal, and FIG. 10 is a close-up view of the same waveform. For this example, only the middle portion is taken from each chip and all other portions are ignored, as described above. For this example, the middle portion may comprise a ½ chip region surrounding the BOC signal transition. Referring to FIGS. 9 and 10, note that the normalized amplitude is one half that of the conventional BOC autocorrelation, for example as depicted in FIGS. 7 and 8 and as discussed above. The reduced-amplitude peaks are a result of processing only one half of each chip, while not processing the rest during correlation operations. Side lobes for this example are centered at +/−0.5 chips. Referring again to relation 1 above, for this example the middle portion may be represented by the portion ranging from t1-t2, where t1=T/4 and t2=3T/4.

Figure 11:
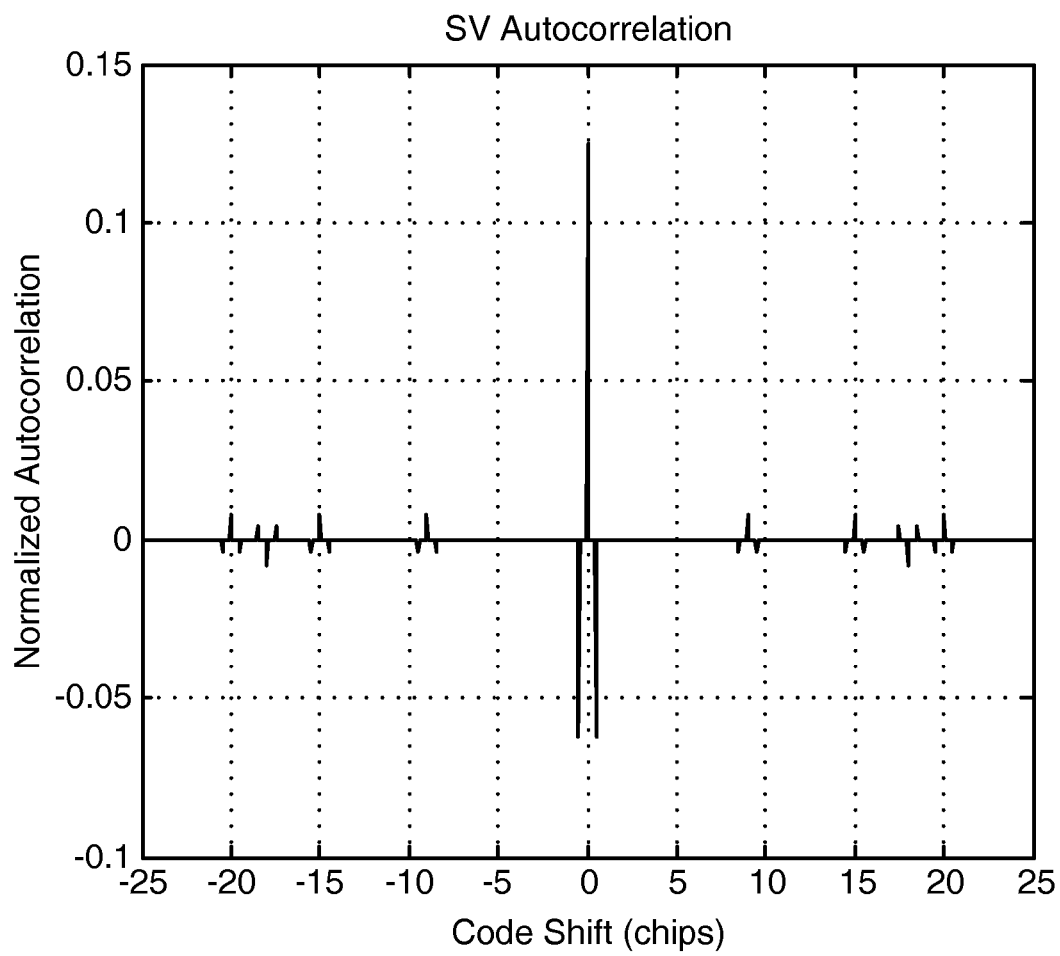
FIG. 11 is a diagram depicting an autocorrelation function for a smaller middle portion of chips in a code sequence of a BOC signal.
Figure 12:
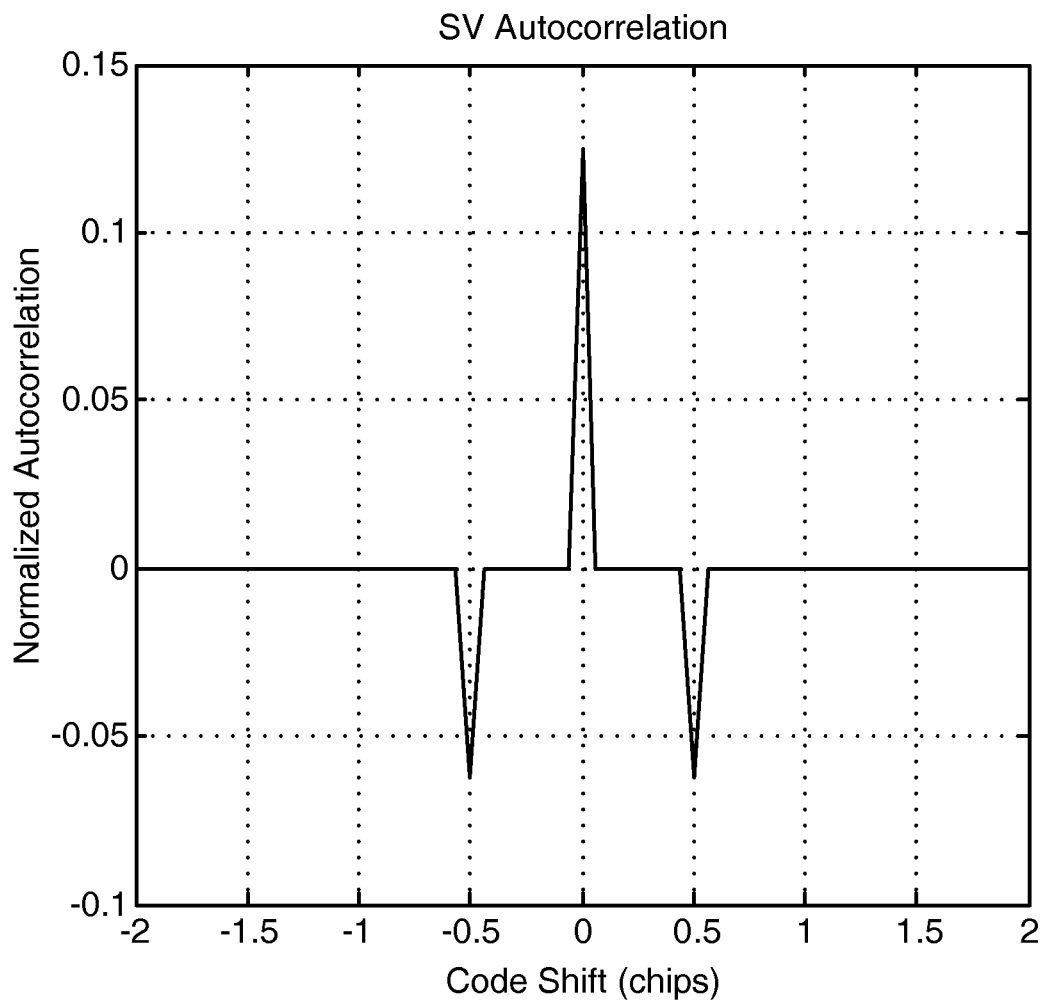
FIG. 12 is a diagram depicting a close-up view of the autocorrelation function for a smaller middle portion of chips in a code sequence of a BOC signal.

FIG. 11 is a diagram depicting an autocorrelation function for a smaller middle portion of each of a plurality of chips of a BOC signal, and FIG. 12 is a diagram depicting a close-up view of the same waveform. For this example, the middle portion comprises ⅛ of a chip in size, with 7/16 of a chip on either side of the middle portion (outside of the middle portion) for each chip. For this example, the normalized amplitude is ⅛ of what it would otherwise be with a conventional BOC autocorrelation function, again as depicted in FIGS. 7-8 and as discussed above. Again referring to relation 1, above, the middle portion may be represented by the portion ranging from t1-t2, where t1=7T/16 and t2=9T/16.

One possible advantage of taking only a middle portion of each chip during autocorrelation processing is that multipath signals may have a reduced effect. For the example of the autocorrelation function depicted in FIG. 12, only multipath signals arriving within approximately 1/16 chip delay in addition to any multipath signals present at approximately ½ chip delay will tend to cause errors by distorting the main peak. Other multipath delays may cause zero errors, as they are ignored during autocorrelation processing for this example. Thus, in this manner, at least a portion of a multipath component may be removed from a power signal. One consequence of reducing the amount of each chip that is processed during correlation operations is a reduction in correlation signal power. Thus, trade-offs may be made between multipath error suppression and correlation signal power.

Figure 13:
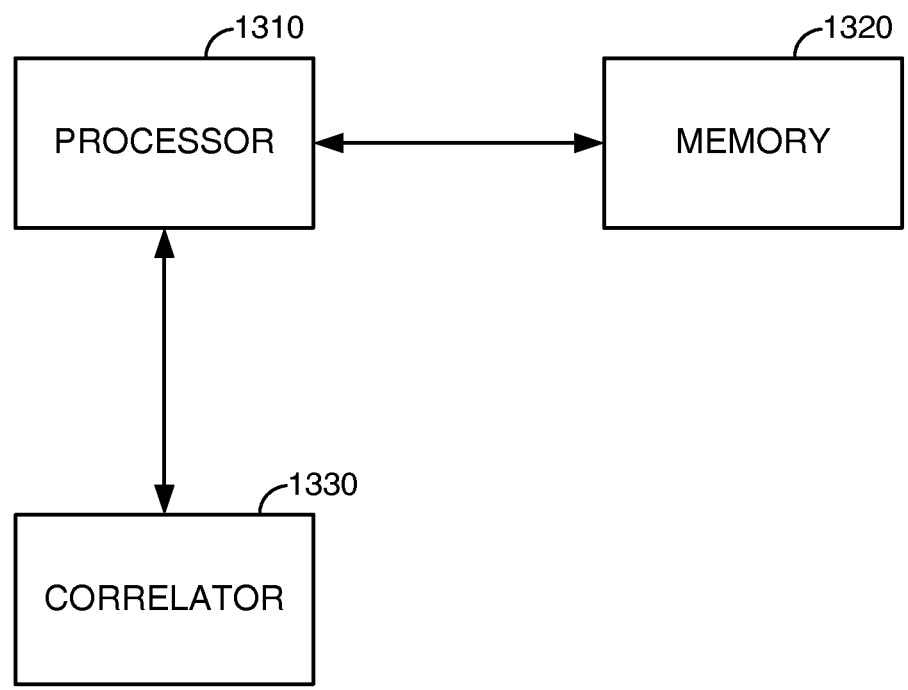
FIG. 13 is a block diagram of an example system for processing binary offset carrier signals derived from PRN codes to determine a position location.

FIG. 13 is an example of a system for acquiring periodically repeating signals from an SPS. However, this is merely an example of a system that is capable of acquiring such signals and other systems may be used without deviating from claimed subject matter. As illustrated in FIG. 13 according to a particular example, such a system may comprise a computing platform 1300 including a processor 1310, a memory 1320, and a correlator 1330. Correlator 1330 may be adapted to produce correlation functions from signals provided by a receiver (not shown) to be processed by processor 1310, either directly and/or through memory 1320. Correlator 1330 may be implemented in any combination of hardware, software, and/or firmware. However, these are merely examples of how a correlator may be implemented and claimed subject matter is not limited in these respects.

According to an example, memory 1320 may store machine-readable instructions which are accessible and executable by processor 1310 to provide at least a portion of a computing platform. Here, processor 1310 in combination with such machine-readable instructions may be adapted to perform all or portions of processes discussed herein. In a particular example, although claimed subject matter is not limited in these respects, processor 1310 may direct correlator 1330 to search for position determination signals as illustrated above and derive measurements from correlation functions generated by correlator 1330.

Figure 14:
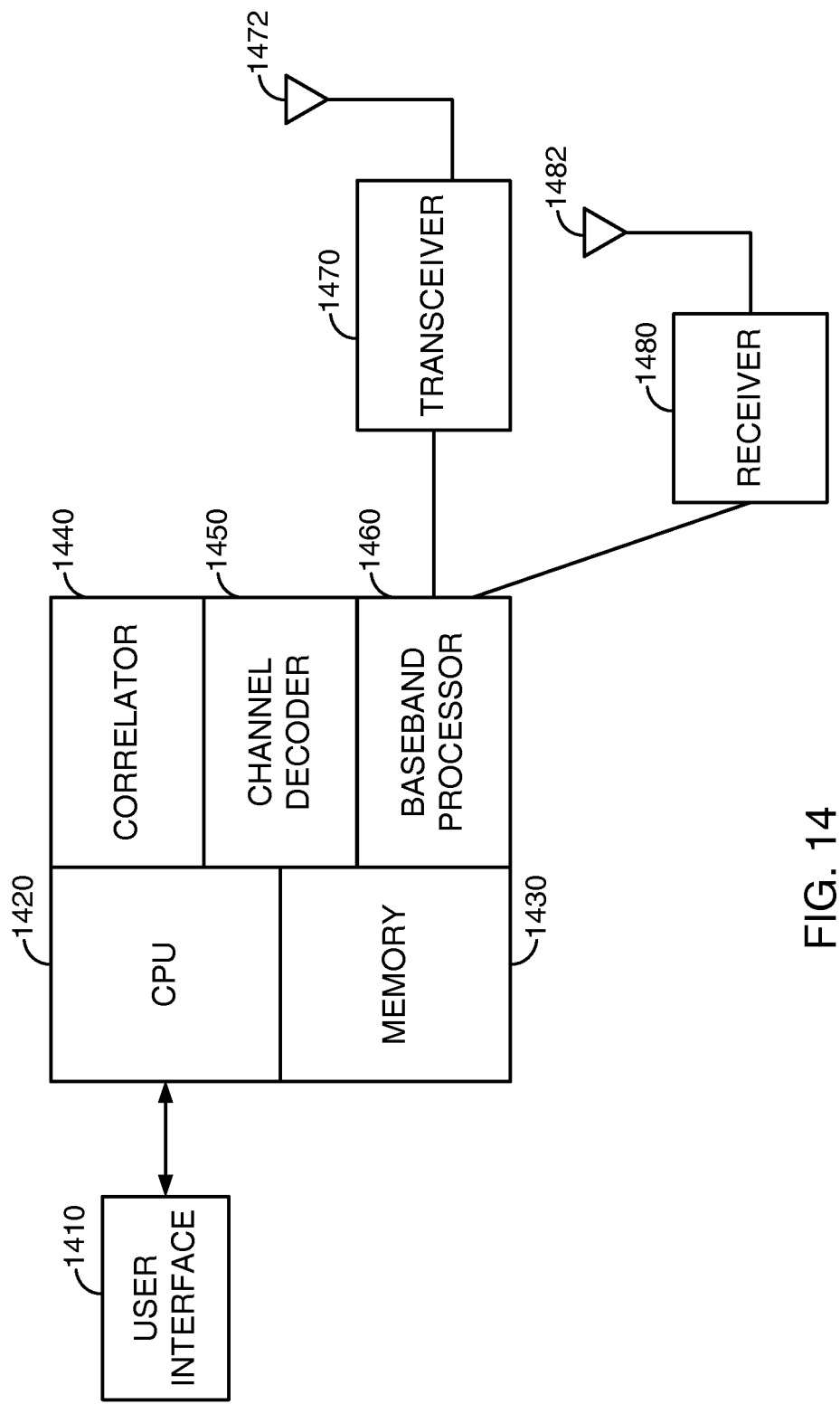
FIG. 14 is a schematic diagram of an example subscriber station.

FIG. 14 is a block diagram of an example of a subscriber station 1400. A radio transceiver 1470 may be adapted to modulate an RF carrier signal with baseband information, such as voice or data, onto an RF carrier, and demodulate a modulated RF carrier to obtain such baseband information. An antenna 1472 may be adapted to transmit a modulated RF carrier over a wireless communications link and receive a modulated RF carrier over a wireless communications link.

A baseband processor 1460 may be adapted to provide baseband information from a central processing unit (CPU) 1420 to transceiver 1470 for transmission over a wireless communications link. Here, CPU 1420 may obtain such baseband information from an input device within a user interface 1410. Baseband processor 1460 may also be adapted to provide baseband information from transceiver 1470 to CPU 1420 for transmission through an output device within user interface 1410.

User interface 1410 may comprise a plurality of devices for inputting or outputting user information such as voice or data. Such devices may include, by way of non-limiting examples, a keyboard, a display screen, a microphone, and a speaker.

A receiver 1480 may be adapted to receive and demodulate transmissions from an SPS, and provide demodulated information to correlator 1440. Correlator 1440 may be adapted to derive correlation functions, for example as illustrated above in relation (1), from the information provided by receiver 1480. For a given PRN code, for example, correlator 1440 may produce a correlation function defined over a range of code phases to set out a code phase search window, and over a range of Doppler frequency hypotheses as described herein. As such, an individual correlation may be performed in accordance with defined coherent and non-coherent integration parameters. Correlator 1440 may also be adapted to derive pilot-related correlation functions from information relating to pilot signals provided by transceiver 1470. This information may be used by a subscriber station to acquire wireless communications services. Channel decoder 1450 may be adapted to decode channel symbols received from baseband processor 1460 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1450 may comprise a turbo decoder.

A memory 1430 may be adapted to store machine-readable instructions which are executable to perform one or more of processes, implementations, or examples thereof which are described or suggested herein. CPU 1420 may be adapted to access and execute such machine-readable instructions. Through execution of these machine-readable instructions, CPU 1420 may direct correlator 1440 to analyze correlation functions provided by correlator 1440, derive measurements from the peaks thereof, and determine whether an estimate of a location is sufficiently accurate. However, these are merely examples of tasks that may be performed by a CPU, and claimed subject matter in not limited in these respects.

The correlation functions described herein may be performed by any of a wide range of possible computing platforms, including, for example, a subscriber station such as that disclosed herein in connection with FIG. 14. For example, correlation functions may be performed at least in part by correlator 1440. However, this is merely one example of how a correlation function may be performed, and the scope of the claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method comprising:
   receiving a signal comprising at least one binary offset carrier (BOC) modulation signal, said BOC modulation signal being modulated with a pseudorandom noise sequence and comprising a plurality of chips, each of said chips having a set interval; and
   correlating said received signal with portions of each chip of said plurality of chips to provide a power signal, said portions of said chips being less than said set interval to remove at least a portion of a multipath component in said received signal from said power signal.

2. The method of claim 1, wherein said portions of each chip of said chips comprise a middle region.

3. The method of claim 2, wherein the middle region comprises approximately one-half of a chip period centered approximately at a mid-point of the chip period for the plurality of chips.

4. The method of claim 2, wherein the middle region comprises approximately one-eighth of a chip period centered approximately at a mid-point of the chip period for the plurality of chips.

5. The method of claim 1, wherein the binary offset carrier modulation signal comprises a BOC(1,1) signal.

6. The method of claim 5, wherein said receiving the signal comprises receiving the BOC(1,1) signal from a satellite.

7. The method of claim 6, wherein the satellite comprises a Galileo satellite.

8. The method of claim 6, wherein the satellite comprises a satellite capable of transmitting an L1C signal.

9. The method of claim 1, wherein said receiving the signal comprises receiving the BOC signal at a subscriber station.

10. The method of claim 1, wherein said portions of each chip of said plurality of chips comprise a region centered at a chip boundary.

11. The method of claim 1, wherein said portions of each chip of said plurality of chips are defined by one or more programmable parameters.

12. The method of claim 11, wherein the one or more programmable parameters comprise a parameter specifying a center location.

13. The method of claim 12, wherein the one or more programmable parameters comprise a parameter specifying a region size.

14. The method of claim 1, wherein said receiving the signal comprises receiving the signal from a pseudolite.

15. The method of claim 1, wherein said portions of each chip of said plurality of chips comprise a middle region and a region centered at a chip boundary.

16. The method of claim 1, wherein said portions of each chip of said plurality of chips comprise a middle region and a region centered at a chip boundary if a bit transition is present approximately at the chip boundary.

17. An article comprising:
   a storage medium, said storage medium comprising machine-readable instructions stored thereon which, if executed by a computing platform, are adapted to cause said computing platform to:
   receive a signal comprising at least one binary offset carrier (BOC) modulation signal, said BOC modulation signal being modulated with a pseudorandom noise sequence and comprising a plurality of chips, each of said chips having a set interval; and
   correlate said received signal with portions of each chip of said plurality of chips to provide a power signal, said portions of said chips being less than said set interval to remove at least a portion of a multipath component in said received signal from said power signal.

18. The article of claim 17, wherein said portions of each chip of said chips comprise a middle region.

19. The article of claim 18, wherein the middle region comprises approximately one-half of a chip period centered approximately at a mid-point of the chip period for each chip of the plurality of chips.

20. The article of claim 18, wherein the middle region comprises approximately one-eighth of a chip period centered approximately at a mid-point of the chip period for each chip of the plurality of chips.

21. The article of claim 17, wherein said portions of each chip of said plurality of chips comprise a region centered at a chip boundary.

22. The article of claim 17, wherein said portions of each chip of said plurality of chips comprise a middle region and a region centered at a chip boundary.

23. The article of claim 17, wherein said portions of each chip of said plurality of chips comprise a middle region and a region centered at a chip boundary if a bit transition is present approximately at the chip boundary.

24. A subscriber station comprising:
   a receiver to receive a signal comprising at least one binary offset carrier (BOC) modulation signal, said BOC modulation signal being modulated with a pseudorandom noise sequence and comprising a plurality of chips, each of said chips having a set interval; and a correlator to correlate at least in part said received signal with portions of each chip of said plurality of chips to provide a power signal, said portions of said chips being less than said set interval to remove at least a portion of a multipath component in said received signal from said power signal.

25. The subscriber station of claim 24, wherein said portions of each chip of said chips comprise a middle region.

26. The subscriber station of claim 25, wherein the middle region comprises approximately one-half of a chip period centered approximately at a mid-point of the chip period for each chip of the plurality of chips.

27. The subscriber station of claim 25, wherein the middle region comprises approximately one-eighth of a chip period centered approximately at a mid-point of the chip period for each chip of the plurality of chips.

28. The subscriber station of claim 24, wherein said portions of each chip of said plurality of chips comprise a region centered at a chip boundary.

29. The subscriber station of claim 24, wherein said portions of each chip of said plurality of chips comprise a middle region and a region centered at a chip boundary if a bit transition is present approximately at the chip boundary.

30. The subscriber station of claim 25, wherein said portions of each chip of said plurality of chips comprise a middle region and a region centered at a chip boundary.

31. A system, comprising:
a position determination entity; and
a subscriber station comprising a receiver to receive a signal comprising at least one binary offset carrier (BOC) modulation signal, said BOC modulation signal being modulated with a pseudorandom noise sequence and comprising a plurality of chips, each of said chips having a set interval, and a correlator to correlate at least in part said received signal with portions of each chip of said plurality of chips to provide a power signal, said portions of said chips being less than said set interval to remove at least a portion of a multipath component in said received signal from said power signal.

32. The system of claim 31, wherein said portions of each chip of said chips comprise a middle region.

33. The system of claim 32, wherein the middle region comprises approximately one-half of a chip period centered approximately at a mid-point of the chip period for each chip of the plurality of chips.

34. The system of claim 32, wherein the middle region comprises approximately one-eighth of a chip period centered approximately at a mid point of the chip period for each chip of the plurality of chips.

35. The system of claim 31, wherein said portions of each chip of said plurality of chips comprise a region centered at a chip boundary.

36. The system of claim 31, wherein said portions of each chip of said plurality of chips comprise a middle region and a region centered at a chip boundary.

37. The system of claim 31, wherein said portions of each chip of said plurality of chips comprise a middle region and a region centered at a chip boundary if a bit transition is present approximately at the chip boundary.

* * * * *